(12) United States Patent
Ali et al.

(10) Patent No.: US 9,275,230 B2
(45) Date of Patent: Mar. 1, 2016

(54) COMMUNICATION WITH A VIRTUAL TRUSTED RUNTIME BIOS

(75) Inventors: Valiuddin Y Ali, Cypress, TX (US); Jose Paulo Xavier Pires, Porto Alegre (BR); James M Mann, Cypress, TX (US); Boris Balacheff, Lyons (FR); Chris I Dalton, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/238,729

(22) PCT Filed: Sep. 29, 2011

(86) PCT No.: PCT/US2011/054045
§ 371 (c)(1),
(2), (4) Date: Aug. 19, 2014

(87) PCT Pub. No.: WO2013/032495
PCT Pub. Date: Mar. 7, 2013

(65) Prior Publication Data
US 2014/0359259 A1    Dec. 4, 2014

(51) Int. Cl.
H04L 29/06     (2006.01)
G06F 21/57     (2013.01)
G06F 9/44      (2006.01)
G06F 9/455     (2006.01)

(52) U.S. Cl.
CPC ............ *G06F 21/572* (2013.01); *G06F 9/4401* (2013.01); *G06F 9/45541* (2013.01); *G06F 9/45558* (2013.01); *G06F 21/57* (2013.01); *G06F 21/575* (2013.01); *G06F 2009/45587* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 5,230,052 A * | 7/1993 | Dayan | ..................... H04L 29/06 713/2 |
| 5,574,920 A | 11/1996 | Parry | |
| 6,003,065 A | 12/1999 | Yan et al. | |
| 7,418,584 B1 | 8/2008 | Klaiber et al. | |
| 7,581,219 B2 | 8/2009 | Neiger et al. | |
| 7,840,398 B2 | 11/2010 | Zimmer et al. | |

(Continued)

FOREIGN PATENT DOCUMENTS

| | | |
|---|---|---|
| JP | 2005-143120 | 6/2005 |
| JP | 2005-529401 | 9/2005 |

(Continued)

OTHER PUBLICATIONS

Garfinkel, Tal, et al. "Terra: A virtual machine-based platform for trusted computing." ACM SIGOPS Operating Systems Review. vol. 37. No. 5. ACM, 2003.*

(Continued)

*Primary Examiner* — Shawnchoy Rahman
(74) *Attorney, Agent, or Firm* — HP Legal Department

(57) ABSTRACT

A computing system and a method of communicating with a virtual trusted runtime BIOS. The computing system can include hardware and a virtual machine monitor. A virtual trusted runtime BIOS can be managed by the virtual machine monitor. A communication channel can communicate with the virtual trusted runtime BIOS. The communication channel can be secured by a secure socket layer.

15 Claims, 4 Drawing Sheets

(56) References Cited

U.S. PATENT DOCUMENTS

| | | |
|---|---|---|
| 8,429,276 B1 * | 4/2013 | Kumar et al. ............... 709/226 |
| 8,977,842 B1 * | 3/2015 | McCorkendale et al. .... 713/152 |
| 2006/0005188 A1 | 1/2006 | Vega et al. |
| 2008/0256637 A1 | 10/2008 | Liu et al. |
| 2009/0125901 A1 | 5/2009 | Swanson |
| 2010/0199062 A1 | 8/2010 | Sancho-Dominguez et al. |
| 2010/0199276 A1 | 8/2010 | Umbehocker |
| 2011/0061046 A1 | 3/2011 | Phillips |
| 2011/0072254 A1 | 3/2011 | Kuang et al. |

FOREIGN PATENT DOCUMENTS

| | | |
|---|---|---|
| JP | 2006-252554 | 9/2006 |
| JP | 2007-213465 | 8/2007 |
| JP | 2008-523511 | 7/2008 |
| JP | 2009-508183 | 2/2009 |
| JP | 2009-176213 | 8/2009 |
| JP | 2009-230433 | 10/2009 |
| JP | 2011-076505 | 4/2011 |
| JP | 2011-145776 | 7/2011 |
| TW | 405091 | 9/2000 |
| TW | 200810485 A | 2/2008 |

OTHER PUBLICATIONS

Pirker, Martin, and Ronald Toegl. "Towards a Virtual Trusted Platform." J. UCS 16.4 (2010): 531-542.*

Haldar, Vivek, Deepak Chandra, and Michael Franz. "Semantic remote attestation: a virtual machine directed approach to trusted computing." USENIX Virtual Machine Research and Technology Symposium. vol. 2004. 2004.*

Santos, Nuno, Krishna P. Gummadi, and Rodrigo Rodrigues. "Towards trusted cloud computing." Proceedings of the 2009 conference on Hot t.*

Taiwan Office Action issued in Appl. No. 101136225 mailed Jun. 30, 2014; 7 pages.

Cavalli et al.; "2.1 Virtualization5", <http://phyweb.lbl.gov/atlaswiki/images/d/d7/VML-report-09-01-23.pdf>, Sep. 1, 2013.

International Search Report and Written Opinion received in PCT Application No. PCT/US2011/054045, Sep. 14, 2012, 9 pages.

* cited by examiner

COMMUNICATION WITH A VIRTUAL TRUSTED RUNTIME BIOS

BACKGROUND

An electronic device, such as a computer or other type of device, can include a Basic Input/Output System (BIOS) that is responsible for starting up the electronic device. During startup, the BIOS initializes and configures components of the electronic device, and loads an operating system in the electronic device. In addition, the BIOS can also provide other services, such as a power management service, a thermal management service, a BIOS update service, and so forth.

BRIEF DESCRIPTION OF THE DRAWINGS

Some embodiments are described with respect to the following figures.

DETAILED DESCRIPTION

Figure 1:
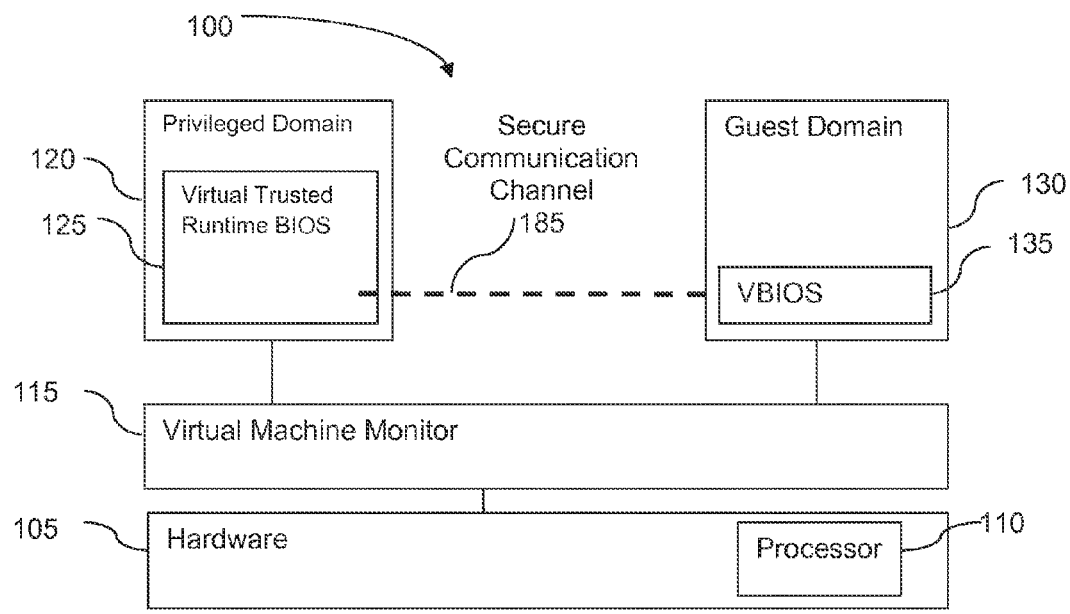
FIG. 1 is a block diagram of a computing system according to an example implementation of secure communication with a virtual trusted runtime BIOS.

A Basic Input/Output System (BIOS) is usually the first code executed by an electronic device when the electronic device starts. Examples of the electronic device include a computer (e.g. desktop computer, notebook computer, tablet computer, server computer, etc.), a handheld device (e.g. personal digital assistant, smartphone, etc.), an electronic appliance, a gaming console, or any other type of electronic device. The BIOS initializes and configures various hardware components of the electronic device, and loads and starts an operating system (OS) of the electronic device. Code for the BIOS is usually stored on a non-volatile memory, such as a flash memory device or other type of programmable read-only memory (ROM).

Although various example BIOS functions are listed above, it is noted that other or alternative BIOS functions can be used in other implementations.

In accordance with some implementations, for more robust system behavior, functions of the BIOS can be provided in a virtual trusted runtime BIOS of the electronic device which may be in the privileged domain, where the privileged domain is a domain of the electronic device that is relatively secure and that has certain predefined privilege(s) not available to other entities in the electronic device. Generally, a "privileged domain" refers to a domain that has predefined privilege(s) that allows an entity in the domain to perform functions in the electronic device that other entities (e.g. OS, application programs, etc.) are not allowed to perform. Also, a privileged domain also has a security mechanism to protect the privileged domain from unauthorized access or attack. Communication with the virtual trusted runtime BIOS may be by a web based protocol. A web based protocol may not be secure and could lead to security vulnerabilities. In one implementation, the communication can be secured by a public key and private key encryption such as a secure socket layer. Securing the communication to the virtual trusted runtime BIOS can be used to secure system management instructions to be handled by a system management mode (SMM).

Examples of a privileged domain include any or some combination of the following: domain 0, which is often the first domain started by a virtual machine monitor (also referred to as a hypervisor) to perform management tasks; a portion of the virtual machine monitor (or hypervisor); a guest virtual machine that has predefined settings to provide the guest virtual machine with enhanced privileges and/or security; or another type of domain in the electronic device with a predefined special privilege and/or security mechanism. The secured privileged domain can include the virtual trusted runtime BIOS which can include a virtual high-privilege mode for handling system management instructions securely without having to have a component on a peer level with the virtual machine monitor such as an system management mode transfer monitor to separate and secure a virtual high-privilege mode from the other domains.

A "virtual machine" (also referred to as a "virtual appliance" or "virtual partition") refers to some partition or segment of a physical machine (the electronic device) that is provided to virtualize or emulate a physical machine. From the prospective of a user or application, a virtual machine looks like a physical machine. A virtual machine includes an operating system (referred to as a guest operating system) and at least one application program.

A virtual machine monitor (VMM), also referred to as a hypervisor, manages the sharing, by the virtual machines, of the physical resources, including the hardware components, of the electronic device. The VMM virtualizes the physical resources. Each virtual machine has an associated virtualized physical resources managed by the VMM. The VMM processes requests for physical resources.

In one implementation, a computing system includes hardware and a virtual machine monitor. A virtual trusted runtime BIOS can be generated by the virtual machine monitor. A communication channel can communicate with the virtual trusted runtime BIOS. The communication channel is secured by a secure socket layer.

In another implementation, a method can secure communications with a virtual trusted runtime BIOS in a computing system. The method can include managing a virtual trusted runtime BIOS and establishing a secure communication channel to the virtual trusted runtime BIOS. After the secure communication channel is established, communicating with the virtual runtime BIOS over the secure communication channel using secure socket layers.

With reference to the figures, FIG. 1 is a block diagram of a computing system according to an example implementation of secure communication with a virtual trusted runtime BIOS. A computing system 100 can include a processor 110. The processor 110 is part of the hardware 105 of the computing system 100. The processor 110 can be a general purpose processor or an application specific processor. As examples, the hardware 105 can also include: I/O devices, volatile memory, secondary storage, flash memory, a network interface controller, a graphics adapter, and so forth. The system can include a virtual machine monitor 115 to manage the physical resources of the hardware components and virtualize the physical resources. The computing system includes a virtual basic input output system (vBIOS) 135 attached to a guest domain 130. The guest domain 130 is a virtual machine which may execute an operating system such as Microsoft Windows, Linux. Unix, or another operating system.

In some examples, the privileged domain 120 is domain 0, which is an administrative domain started by the VMM 102 upon system startup, and which has enhanced privileges and security mechanisms. Examples of tasks performed by domain 0 include creating and configuring guest domains. Each of domain 0 and guest domains is considered a corresponding virtual machine. The privileged domain 120 can be separate from the VMM 115. In alternative implementations, the privileged domain 120 can be part of the VMM 115. In such alternative implementations, the virtual trusted runtime BIOS function 125 is part of the VMM 115. The privileged domain 120 can be a trusted domain as it is generated or managed by the trusted VMM 115.

The VMM 115 may be trusted because a key may be generated or unsealed by a trusted platform module (TPM) or other device which may include a virtual TPM, the BIOS or another device at initialization. The key may be used to trust the privileged domain 120. The key may be part of a certificate that is used to trust the VMM and thus the privileged domain 120 and the virtual trusted runtime BIOS. The key may be used as part of the certificate to generate an SSL communication. The key may be stored on the computing system at the time of manufacture or the key may be generated at runtime. The key may be an asymmetric key such as a public key or a private key.

The provision of the BIOS function 125 in the privileged domain 120 implements a "BIOS in a cloud," also referred to as "virtual trusted runtime BIOS 125" or BIOS.v. The "cloud" can refer to the privileged domain 120 (or some other trusted domain). The cloud can be located either in the computing system 100 or external of the computing system 100. For example, the cloud containing a virtual trusted runtime BIOS 125 function can be accessible by the computing system 100 over a network. The network may be for example a local, wide or worldwide network.

In some implementations, the web-based interface provided by a web-based network communication function is part of a service requestor-service provider model that allows the requestor (e.g. a domain) to request a service (e.g. BIOS service) from a provider (e.g. server computer) over a network. As examples, the web-based interface can be a web services interface. A web service refers to a mechanism designed to support interoperable machine-to-machine which may be virtual machine to virtual machine interaction over a network. The web services interface can be according to a format described by a Web Services Description Language (WSDL), as defined by the World Wide Web Consortium (W3C). Alternatively, the web services interface can be according to a Simple Object Access Protocol (SOAP) (also defined by the W3C), which is a protocol for exchanging structured information in the implementation of web services over networks.

As yet another alternative, the web-based interface can be according to a Representational State Transfer (REST) architecture, which includes clients and servers, where clients can submit requests to servers, and servers can provide responses to clients. Requests and responses are built around the transfer of representations of resources. A resource can be any coherent and meaningful concept that may be addressed. A representation of a resource is typically a document that captures the current or intended state of a resource. In the REST architecture, a request submitted by a client (e.g. the electronic device) can be a Hypertext Transfer Protocol (HTTP) Get request, in some examples. The server (e.g. server computer) can provide an HTTP response to the HTTP Get request. HTTP may include secure Hypertext Transfer Protocol (HTTPs).

In the web-based interface, a resource (e.g. the internal virtual trusted runtime BIOS function or external virtual trusted runtime BIOS function) can be accessed by issuing a virtual trusted runtime BIOS access request that contains an address of the requested resource. The address can be a web address, such as a Uniform Resource Locator (URL), an Internet Protocol (IP) address, Simple Mail Transfer Protocol (SMTP), or some other address that can uniquely identify the requested resource.

In response to the virtual trusted runtime BIOS access request containing the address that is received at the web-based interface, the web-based network communication function can direct the request to an appropriate one of the internal and external virtual trusted runtime BIOS functions. In some cases, the web-based network communication function can direct the request to both the internal and external virtual trusted runtime BIOS functions.

The web-based network communication with the virtual trusted runtime BIOS is secured by for example Secure Sockets Layer (SSL) which is a protocol for managing the security of a message transmission on the Internet. Since the communication with the BIOS is web-based communications such as those used on the internet a secure socket layer can be used to secure the communication with the virtual trusted runtime BIOS by creating a secure communications channel 185. Secure socket layer (SSL) may also may also mean Transport layer security (TLS) or any other security protocol for securing web-based communication.

A sockets method of passing data back and forth between a client and a server program in a network or between program layers in the same computer, therefore SSL can be used to secure the communications with the virtual trusted runtime BIOS if the virtual trusted runtime BIOS is hosted by a privileged domain for example or if hosted on a network somewhere else. SSL uses the public-and-private key encryption system, which also can include the use of a digital certificate.

An example of establishing the secure communications channel may include a domain, such as guest domain 130, making request to the virtual trusted runtime BIOS 125 to identify itself. The virtual trusted runtime BIOS 125 can then send a copy of an SSL certificate to the domain. The domain checks whether it trusts the SSL certificate and if the domain trusts the certificate the guest domain send a message to the virtual trusted runtime BIOS. The message from the guest domain to the virtual trusted runtime BIOS may include a session key seed that is encrypted with an SSL public key. The virtual trusted runtime BIOS 125 can then send back a digitally signed acknowledgement to the domain to start an SSL encrypted session. Encrypted data can now be shared between the domain and the virtual trusted runtime BIOS 125.

In another example of establishing the secure communication, the domain may include an SSL certificate and the domain may be asked to identify itself and the domain responds by sending a copy of the SSL certificate and which the virtual trusted runtime BIOS determines whether it trusts the certificate and sends a message to the domain. The message from the virtual trusted runtime BIOS 125 may include a session key which is encrypted with an SSL public key. The domain can send back a digitally signed acknowledgement to the virtual trusted runtime BIOS to start an SSL encrypted session, also resulting in sharing encrypted data between the domain and the virtual trusted runtime BIOS.

Figure 2:
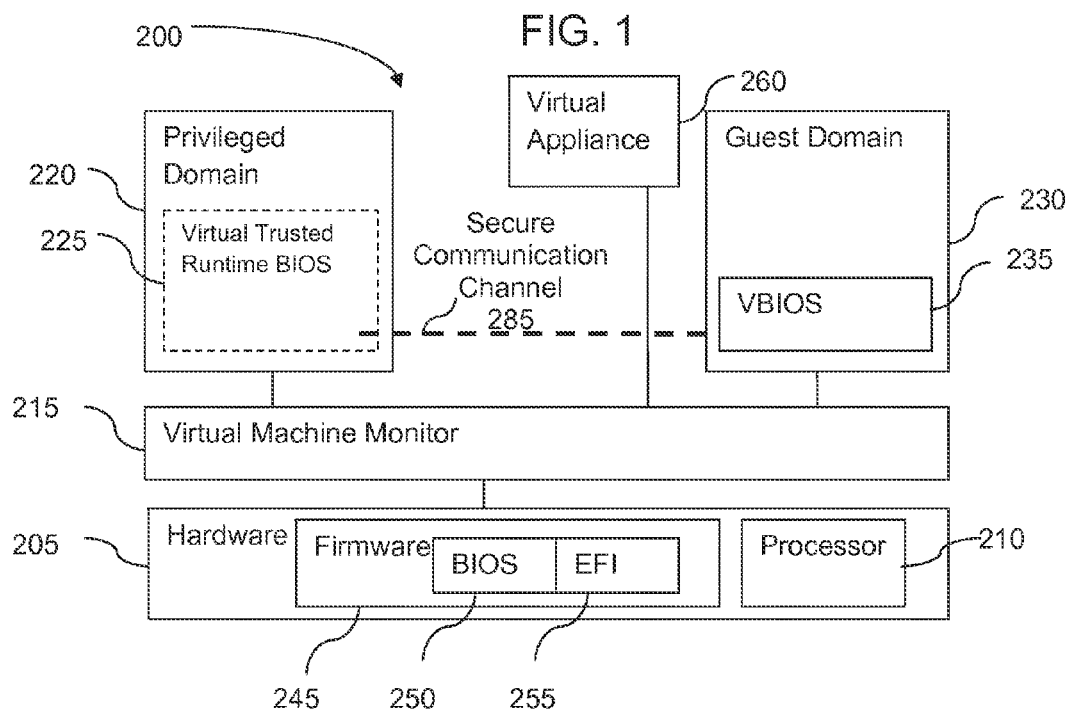
FIG. 2 is a block diagram of a computing system according to an example implementation of secure communication with a virtual trusted runtime BIOS.

FIG. 2 is a block diagram of a computing system according to an example implementation of a virtual high-privilege mode. A computing system 200 can include a processor 210. The processor 210 is part of the hardware 205 of the computing system 200. The hardware can include firmware 245 which may include the basic input/output system (BIOS) 250 and the extensible firmware interface (EFI) 255. The BIOS 250 may be referred to as a physical BIOS. A "physical BIOS" refers to BIOS code that resides in non-volatile memory such as flash memory or other programmable read/only memory, and which is to be executed upon startup of the computing system 200. In some implementation the physical BIOS may be a reduced (simplified) version of the BIOS since at least part of the system management mode is moved to the virtual trusted runtime BIOS 225. If a virtual trusted runtime BIOS 225 is implemented the physical BIOS 250 may remain unlocked to allow changes because of the trust attached to the virtual trusted runtime BIOS 225. The processor 210 can be a general purpose processor or an application specific processor. The system can include a virtual machine monitor VMM 215 to manage the physical resources of the hardware components and virtualize the physical resources. The computing system 100 includes a virtual basic input output system (vBIOS) 235 attached to a guest domain 230. The guest domain 230 is a virtual machine which may execute an operating system such as Microsoft Windows, Linux, Unix, or another operating system.

In some examples, the privileged domain 220 is domain 0, an administrative domain started by the VMM 215 upon system startup, which has enhanced privileges and security mechanisms. Examples of tasks performed by domain 0 include creating and configuring guest domains. Each of domain 0 and guest domains is considered a corresponding virtual machine. The privileged domain 220 can be separate from the VMM 215. In alternative implementations, the privileged domain 220 can be part of the VMM 215. In such alternative implementations, the virtual trusted runtime BIOS 225 is part of the VMM 215.

A secure communication channel 285 can be used to secure communications such as a system management request. A system management request can be sent by a web service's application programming interface (API). In another implementation the system management request can be packaged in a Windows management instrumentation (WMI) wrapper. Another implementation includes using a remote procedure call (RPC) to forward the system management request to the virtual system management mode.

In some implementations, BIOS in a cloud is based on the following premises of a VMM-based architecture: the physical BIOS knows and trusts the main runtime entity (VMM 215) that the physical BIOS is booting, and the BIOS-trusted VMM has the ability to trap and turn off all I/O requests (to access BIOS functionality) other than those coming from the privileged domain. In some implementations, a BIOS verification mechanism can be provided to authenticate the origin of the VMM that is to be booted by the computing system. Such verification mechanisms allow an administrator or other user to specify that only an authorized VMM can be booted in the computing system. The verification mechanism assures that the VMM image that is in the computing system has not been modified maliciously, and that the VMM can be trusted. The physical BIOS can visually verify the VMM image, and ensure that the VMM is booted with a known set of controlled operational settings that have previously been specified.

After verifying that an authorized \NM has been booted, the physical BIOS can then defer or omit execution of various security measures that the physical BIOS would normally perform to prevent corruption by unauthorized or malicious code. For example, the physical BIOS can choose to not lock BIOS flash registers and/or portions of flash memory.

In implementations in which the virtual trusted runtime BIOS 225 is provided internally in a computing system 200. From the perspective of a guest virtual machine or other entity of the computing system that wants to access BIOS services, the cloud including the BIOS services can be located anywhere, including in a location that is external of the computing system.

In one implementation with a virtual trusted runtime BIOS, no other domain than privileged domain or another trusted domain will be able to communicate with BIOS. This can be because all communication from a guest domain to the BIOS are trapped and routed to the privileged domain portion for the appropriate filter to receive and process. The virtual high-privilege mode in the privilege domain can then process the request and can make direct or indirect calls to the flash or the BIOS. This call from the privileged domain to the BIOS which will then be allowed by the hypervisor to go through since Hypervisor can detect a call originating from the privileged domain rather than a guest domain. Given open but exclusive access to the physical BIOS, the communication from the privileged domain to physical BIOS is secured, the privileged domain can now write or read all settings of BIOS at runtime eliminating a situation where the processor would enter system management mode.

Even though the virtual trusted runtime BIOS is secure, communication with the virtual trusted runtime BIOS may not be. To secure the web-based communication with the virtual trusted runtime BIOS a SSL handshake can occur between the virtual trusted runtime BIOS and a requesting domain for example such as the guest domain 230. In this example the virtual trusted runtime BIOS may include an SSL certificate such as one a web server would have and the requesting domain may use that certificate to secure the communication with the virtual trusted runtime BIOS such that the requesting domain operates similar to a web browser on a secure website.

Figure 3:
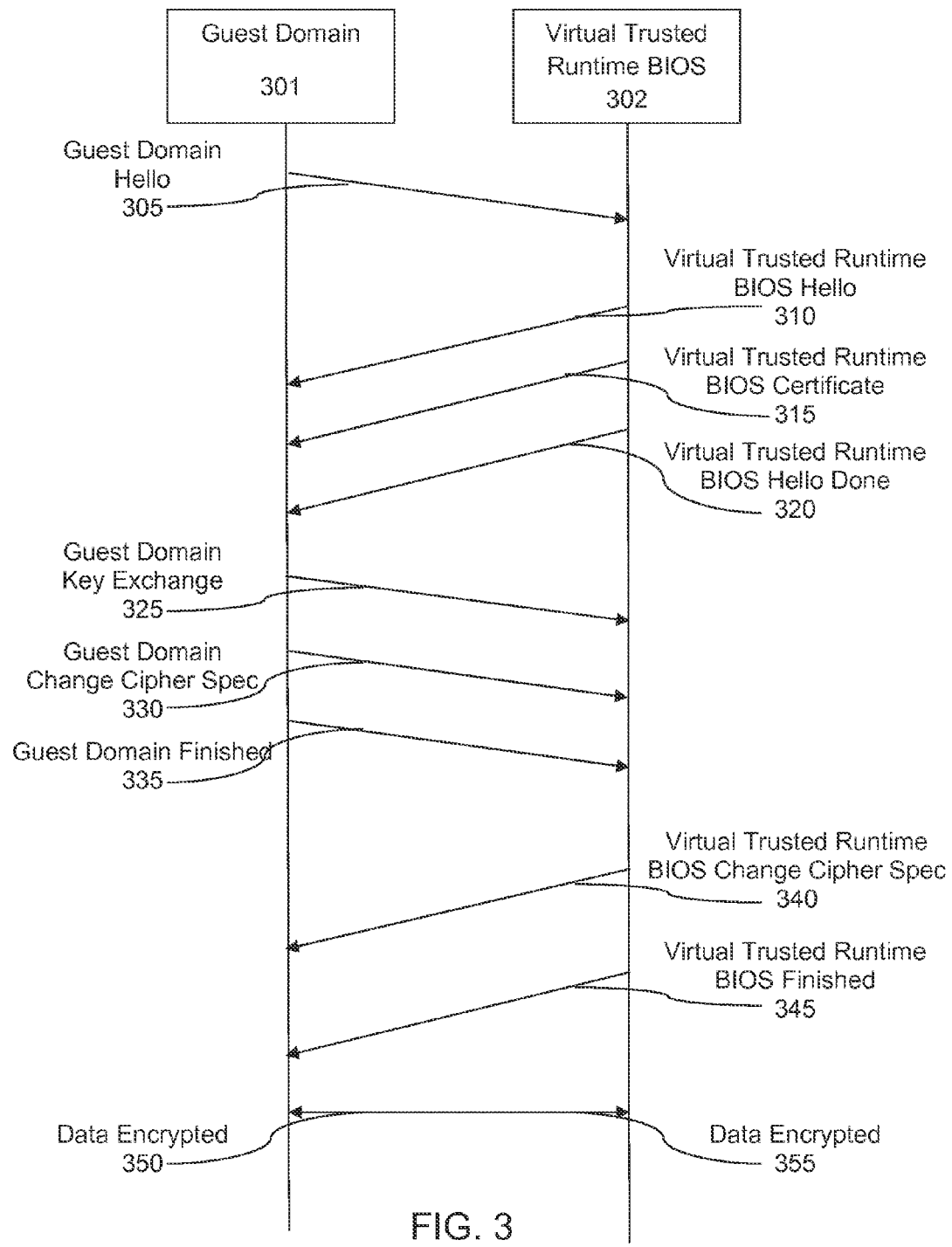
FIG. 3 is a flow diagram of a method of securing communications with a virtual trusted runtime BIOS according to an implementation.

FIG. 3 is a flow diagram of a method of securing communications with a virtual trusted runtime BIOS according to an implementation. To initiate a SSL communication between the guest domain 301 and the virtual trusted runtime BIOS 302 the guest domain says hello at 305. The virtual trusted runtime BIOS then says hello at 310. The virtual trusted runtime BIOS send its certificate to the guest domain at 315.

In some implementations the virtual trusted runtime BIOS may send a public key to the guest domain. The virtual trusted runtime BIOS may request the client certificate.

The virtual trusted runtime BIOS signals the guest domain that the Hello is done at 320. The guest domain then does a key exchange at 325 using the public key from the certificate provided by the virtual trusted runtime BIOS to exchange a session key. The session key will be used to setup symmetric encryption and communicated to the virtual trusted runtime BIOS using asymmetric encryption. The guest domain may provide a certificate if the virtual trusted runtime BIOS requests it and the guest domain has a certificate.

The guest domain can signal to the virtual trusted runtime BIOS that there is a change in the Cipher Spec and that the next communication from the guest domain will be encrypted at 330 using the session key. The guest domain signals that it is finished at 335 which is encrypted using the session key. The virtual trusted runtime BIOS can change cipher spec at 340 indicating that the next message is going to be encrypted using the session key. A finished message that is encrypted is sent by the virtual trusted runtime BIOS at 345. Encrypted data can be transferred back and forth between the guest domain and the virtual trusted runtime BIOS at 350 and 355.

Figure 4:
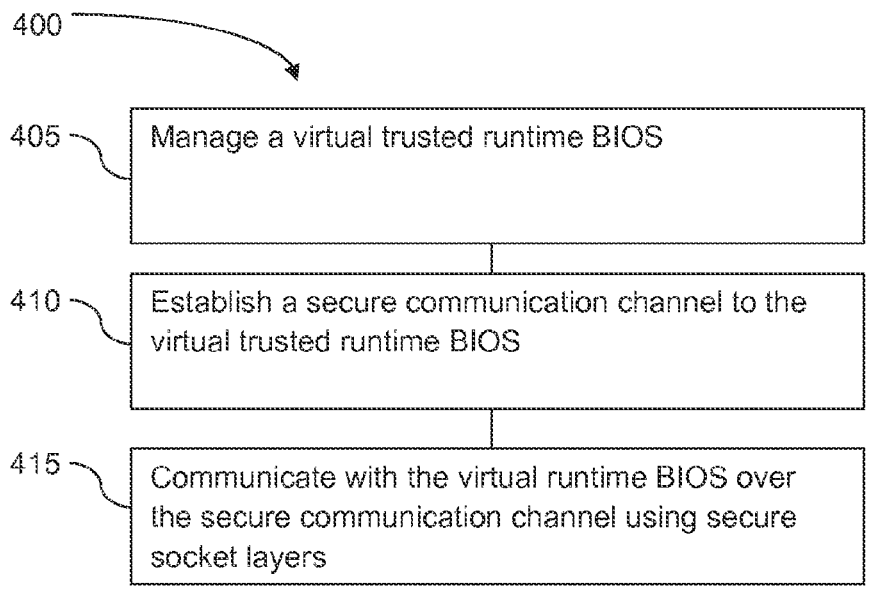
FIG. 4 is a flow diagram of a method of securing communications with a virtual trusted runtime BIOS according to an implementation.

FIG. 4 is a flow diagram of a method 400 of securing communications with a virtual trusted runtime BIOS according to an implementation. The method can begin by managing a virtual trusted runtime BIOS at 405. The virtual trusted runtime BIOS 125 can be managed by the virtual machine monitor 115. A secure communication channel can be established to the virtual trusted runtime BIOS at 410.

An example of establishing the secure communications channel may include a domain, such as guest domain 130, making request to the virtual trusted runtime BIOS 125 to identify itself. The virtual trusted runtime BIOS 125 can then send a copy of an SSL certificate to the domain. The domain checks whether it trusts the SSL certificate and if the domain trusts the certificate the guest domain send a message to the virtual trusted runtime BIOS. The message from the guest domain to the virtual trusted runtime BIOS may include a session key seed that is encrypted with an SSL public key. The virtual trusted runtime BIOS 125 can then send back a digitally signed acknowledgement to the domain to start an SSL encrypted session. Encrypted data can now be shared between the domain and the virtual trusted runtime BIOS 125.

In another example of establishing the secure communication, the domain may include an SSL certificate and the domain may be asked to identify itself and the domain responds by sending a copy of the SSL certificate and which the virtual trusted runtime BIOS determines whether it trusts the certificate and sends a message to the domain. The message from the virtual trusted runtime BIOS 125 may include a session key which is encrypted with an SSL public key. The domain can send back a digitally signed acknowledgement to the virtual trusted runtime BIOS to start an SSL encrypted session, also resulting in sharing encrypted data between the domain and the virtual trusted runtime BIOS.

The secure communication channel can be for example a web based communications protocol. Communication with the virtual trusted runtime BIOS is through a secure communication channel using secure socket layers at 415.

Figure 5:
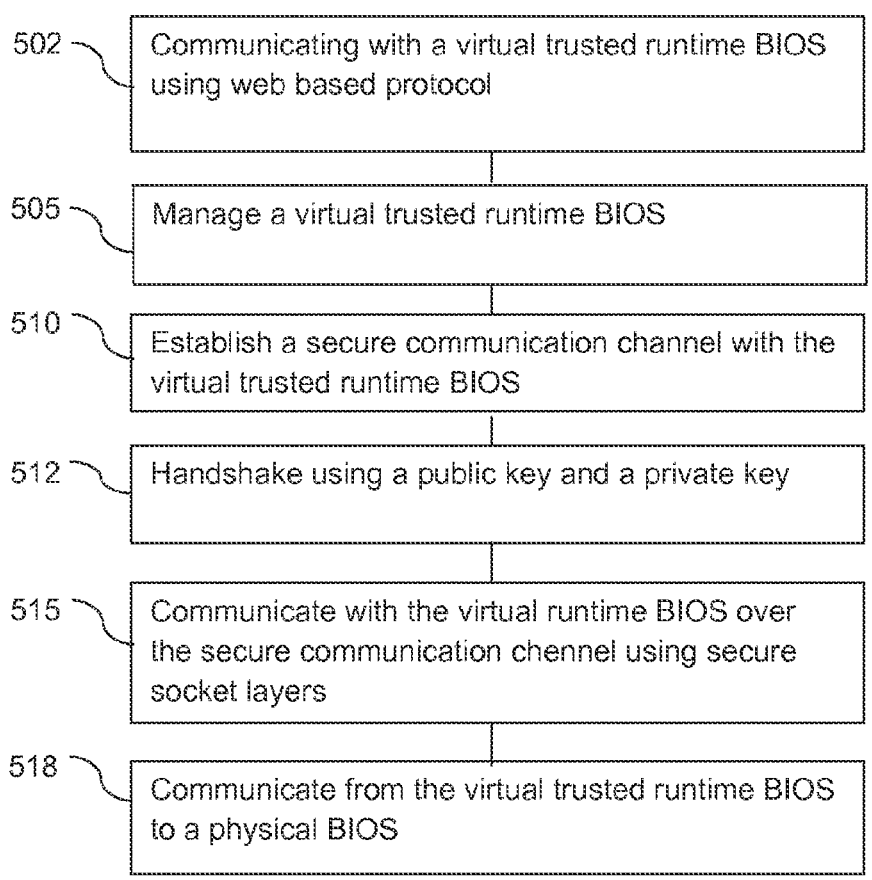
FIG. 5 is a flow diagram of a method of securing communications with a virtual trusted runtime BIOS according to an implementation.

FIG. 5 is a flow diagram of a method 500 of securing communications with a virtual trusted runtime BIOS according to an implementation. The method can begin by communicating with a virtual trusted runtime BIOS using web based protocol at 502. The virtual trusted runtime BIOS can be managed at 505 so that the virtual trusted runtime BIOS is a trusted component of the computing system 100. The virtual trusted runtime BIOS 125 can be managed by the virtual machine monitor 115. A secure communication channel can be established with the virtual trusted runtime BIOS at 510. The secure communication channel can be for example a web based communications protocol. A handshake using a public key and a private key can be used to secure the communication at 512. To secure the communication with the virtual trusted runtime BIOS a secure communication channel using secure socket layers is used for the communication with the virtual trusted runtime BIOS at 515. The virtual trusted runtime BIOS can communicate with a physical BIOS at 518 to change system configurations for example. In some implementations the virtual trusted runtime BIOS is located remotely from the computing system and the virtual machine monitor can route the communication to the virtual trusted runtime BIOS regardless of where the virtual trusted runtime BIOS is located.

Figure 6:
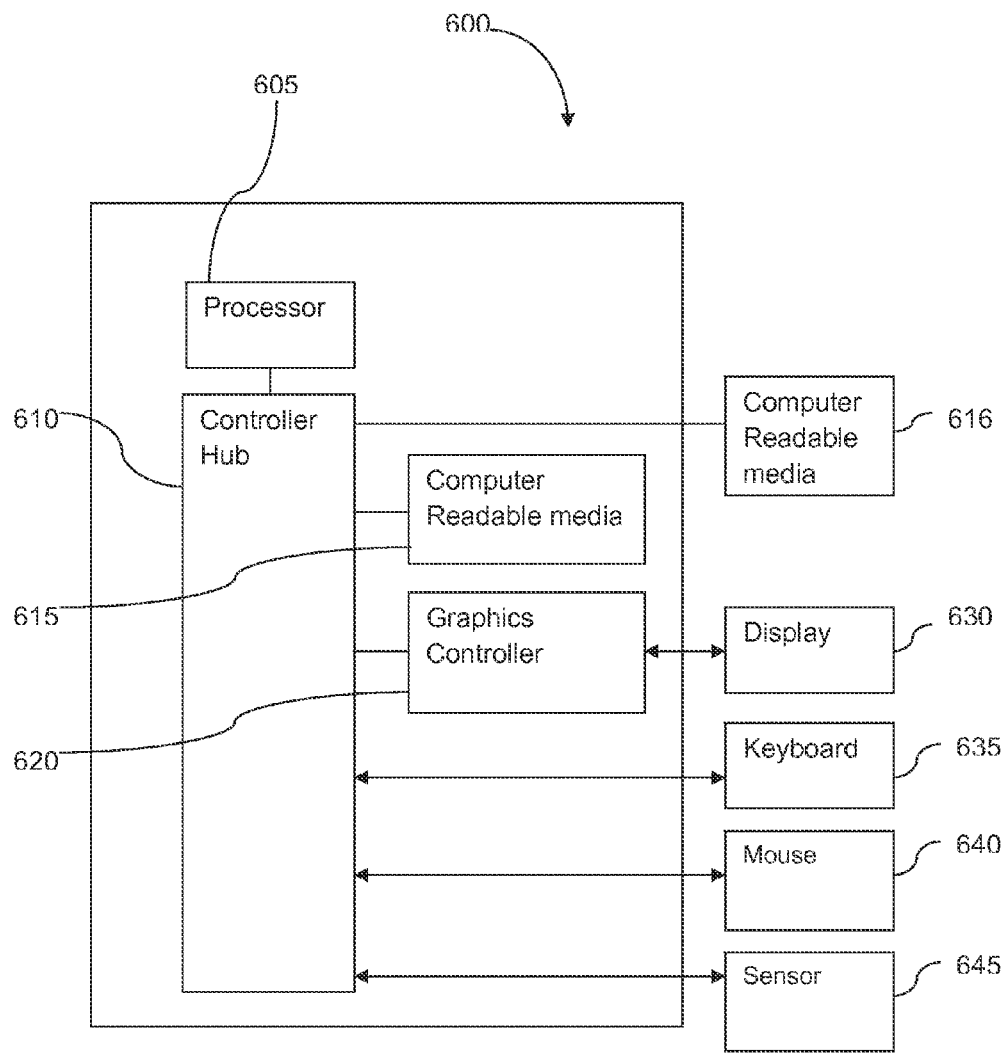
FIG. 6 is a block diagram of a computing system according to an example implementation of a computer readable medium.

FIG. 6 is a block diagram of a computing system 600 according to an example implementation of a computer readable media 615-616. The computer readable media 615-616 can include code that if executed by a processor 605 can cause a computing system to manage a communication with a virtual trusted runtime BIOS. The computer system can include hardware such as a controller hub 610, a graphics controller 620. The computer system may be connected to a display 630, keyboard 635, mouse 640, sensor 645, and other devices. The code can also establish a secure communication layer with the virtual trusted runtime BIOS. Communication with the virtual runtime BIOS can be over the secure communication channel using secure socket layers.

The computing system can also include code that if executed causes a computing system to communicate with a virtual runtime BIOS located remotely from the computing system. If the BIOS is located remotely from the computing system the component, such as a domain, making the request to the virtual runtime BIOS may not be aware that the BIOS is located remotely. The VMM may route the request without notifying the requesting component. The communicating with the virtual runtime BIOS can be by a web communication protocol whither the virtual runtime BIOS is located locally or remotely. The component may establish a secure communication channel including a handshake using a public key and a private key for example.

Various modules, such as those depicted in other figures, can be implemented as machine-readable instructions that can be executed on one or multiple processors. A processor can include a microprocessor, microcontroller, processor module or subsystem, programmable integrated circuit, programmable gate array, or another control or computing device.

The machine-readable instructions can be stored in machine-readable or computer-readable storage media, which can be implemented as one or multiple computer-readable or machine-readable storage media. The storage media can include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computing system comprising:
   hardware hosting a quest domain;
   a virtual machine monitor;
   a virtual trusted runtime basic input output system managed by the virtual machine monitor, wherein the virtual trusted runtime basic input output system is located remote from the hardware; and
   a communication channel for a virtual basic input output system of the guest domain to communicate with the virtual trusted runtime basic input output system, wherein the communication channel is secured by a secure socket layer, wherein the communication channel is for the virtual basic input output system of the guest domain to request a basic input output service from the virtual trusted runtime basic input output system.

2. The computing system of claim 1, further comprising a public key and a private key to provide secure communications with the virtual trusted runtime basic input output system.

3. The computing system of claim 1, wherein the communication channel is based on a web communications protocol.

4. The computing system of claim 3, wherein the communication channel is between a Hypertext Transfer Protocol (HTTP) layer and a Transport Control Protocol (TCP) layer.

5. The computing system of claim 1, further comprising a privileged domain to host the virtual trusted runtime basic input output system.

6. The computing system of claim 1, further comprising a transceiver to communicate with the virtual trusted runtime basic input output system.

7. A method of securing communications with a virtual trusted runtime basic input output system in a computing system comprising:
   managing the virtual trusted runtime basic input output system;
   establishing a secure communication channel from a virtual basic input output system of a guest domain to the virtual trusted runtime basic input output system, wherein the virtual trusted runtime basic input output system is located remote from a hardware hosting the guest domain; and
   communicating with the virtual trusted runtime basic input output system over the secure communication channel using a secure socket layer, wherein the communicating is for the virtual basic input output system of the guest domain to request a basic input output service from the virtual trusted runtime basic input output system.

8. The method of claim 7, further comprising:
   communicating from the virtual trusted runtime basic input output system to a physical basic input output system.

9. The method of claim 8, wherein the virtual trusted runtime basic input output system is located remotely from the physical basic input output system.

10. The method of claim 7, wherein the communicating with the virtual trusted runtime basic input output system is based on a web communication protocol.

11. The method of claim 7, wherein the establishing the secure communication channel includes a handshake using a public key and a private key.

12. A non-transitory computer readable medium comprising code that when executed by a processor of a computing system, causes the processor to:
   manage a communication with a virtual trusted runtime basic input output system of the computing system;
   establish a secure communication channel from a virtual basic input output system of a guest domain to the virtual trusted runtime basic input output system, wherein the virtual trusted runtime basic input output system is located remote from a hardware hosting the quest domain; and
   communicate with the virtual trusted runtime basic input output system over the secure communication channel using a secure socket layer, wherein the secure communication channel is for the virtual basic input output system of the guest domain to request a basic input output service from the virtual trusted runtime basic input output system.

13. The non-transitory computer readable medium of claim 12, wherein the virtual trusted runtime basic input output system is located remote from a physical basic input output system of the computing system.

14. The non-transitory computer readable medium of claim 12 further comprising code that when executed by the processor, causes the processor to:
   communicate with the virtual trusted runtime basic input output system using a web communication protocol.

15. The non-transitory computer readable medium of claim 12 further comprising code that when executed by the processor, causes the processor to:
   establish the secure communication channel via a handshake using a public key and a private key.

* * * * *